United States Patent [19]

Aoyama et al.

[11] Patent Number: 5,485,218
[45] Date of Patent: Jan. 16, 1996

[54] IMAGE PROCESSOR FOR PRODUCING EVEN FIELD VIDEO DATA BASED ON ODD FIELD VIDEO DATA

[75] Inventors: Yasutada Aoyama, Inazawa; Hiroyuki Takada, Aichi; Koichi Hayashi, Nagoya; Norio Chaya, Nagoya; Hiroshi Nishikawa, Nagoya, all of Japan

[73] Assignees: Brother Kogyo Kabushiki Kaisha; Xing Inc., both of Aichi, Japan

[21] Appl. No.: 375,685

[22] Filed: Jan. 20, 1995

[30] Foreign Application Priority Data

Jan. 21, 1994 [JP] Japan .................................... 6-005337

[51] Int. Cl.$^6$ .............................. H04N 7/01; H04N 11/20
[52] U.S. Cl. .................................... 348/447; 348/448
[58] Field of Search .................... 348/447, 441, 348/448, 450, 453, 455, 458; H04N 7/01, 11/20

[56] References Cited

U.S. PATENT DOCUMENTS

| 4,322,750 | 3/1982 | Lord et al. | 348/447 |
| 4,683,497 | 7/1987 | Mehrgardt | 348/447 |
| 4,701,793 | 10/1987 | den Hollander et al. | 348/447 |
| 4,996,595 | 2/1991 | Naito et al. | 348/447 |
| 5,182,643 | 1/1993 | Futscher | 348/447 |

Primary Examiner—James J. Groody
Assistant Examiner—Michael H. Lee
Attorney, Agent, or Firm—Oliff & Berridge

[57] ABSTRACT

Interpolating processes for vertically aligned horizontal scanning lines are performed with respect only to red component video data so as to simplify the structure of an image processor and to decrease the number of components that are required for interpolation. Interpolation is always performed for the green component video data, which makes up a great deal of the luminance component. Even when only green is interpolated, 59% of the total luminance component of yellow is interpolated so that flicker is reduced to a practical level.

22 Claims, 5 Drawing Sheets

IMAGE PROCESSOR FOR PRODUCING EVEN FIELD VIDEO DATA BASED ON ODD FIELD VIDEO DATA

BACKGROUND OF THE INVENTION

1. Field of the Invention

The present invention relates to an image processor for forming a visible image based on digitized video signal through interlaced scanning according to a National Television Standard Committee (NTSC) format for constructing one frame with even field and odd field.

2. Description of the Prior Art

To display a picture or an image on a TV screen, a video signal is subjected to interlaced scanning. Data of one frame worth of video signal is divided into data for odd number scan lines (i.e., for the odd field as represented by the dotted lines in FIG. 2) and even number scan lines (i.e., for the even field as represented by the solid lines in FIG. 2).

Generally, the video signal includes data for scanning 525 vertically aligned horizontal lines using interlaced scanning. About 480 seen lines actually appear on the monitor screen, The remaining 45 lines do not appear on the monitor screen and non-display periods for this 45 lines is termed flyback. Therefore, about 480 lines worth of information are required to digitize end store one complete picture.

A picture can be formed by using the same field information when scanning both the odd field and the even field. For example, odd field information can be used during scanning for both even and odd fields. By doing so, capacity of external memory units required for storing digitized video information can be reduced. However, this generates flicker in the vertical direction. An image processor shown in FIG. 1 has been proposed to prevent the occurrence of flicker. With the configuration shown in FIG. 1, 240 lines of display information are artificially increased to 480 lines of information during reproduction.

The image processor shown in FIG. 1 includes a central processing unit (CPU) 32, a field memory 21, a synchronization signal generator 28, three color blocks 26a through 26c, an RGB encoder 27, and a television monitor 30. Each of the red component block 26a, the green component block 26b and the blue component block 26c includes a line memory 22, a calculation circuit 23, a selector 24 and a digital-to-analog (D/A) converter 25.

The field memory 21 is connected to receive output from an external memory unit 20 under the aegis of the CPU 32. The field memory 21 is further connected to receive a vertical synchronization signal 33 and a horizontal synchronization signal 34 from the synchronization signal generator 28. Output of the field memory 21 is connected separately to the line memory 22, the calculation circuit 23 and the selector 24 of each of the color blocks 26a through 26c.

The line memory 22 of each of the color blocks 26a through 26c is additionally connected to receive the horizontal synchronization signal 34 from the synchronization signal generator 28. Each calculation circuit 23 is connected to receive outputs from its associated line memory 22 and the field memory 21. Each selector 24 is connected to receive outputs from its associated calculation circuit 23 and the field memory 21. A field identification signal 29 is applied to the respective selectors 24 from the synchronization signal generator 28. Each digital-to-analog converter 25 is connected to receive output from its associated selector 24. The output of each D/A converter 25 is applied to the RGB encoder 27, which is also connected to receive output from the synchronization signal generator 28. The output from the RGB encoder 27 is connected to the television monitor 30.

In operation, the external memory unit 20 stores digitized video signal relating to only odd field information. The CPU 32 retrieves such a video signal from the external memory unit 20 and writes it in the field memory 21. Red (R) component contained in the video signal is retrieved from the field memory 21 in timed relation to the vertical synchronization signal 33 and the horizontal Synchronization signal supplied from the synchronization signal generator 28 and is written in the line memory 22 and the calculation circuit 23, both shown in block 26a.

The calculation circuit 23 also receives information outputted from the line memory 22. The information outputted from the line memory 22 is the preceding line information with respect to the line information currently supplied to the calculation circuit 23 from the field memory 21. Therefore, the calculation circuit 23 is supplied with two pieces of scan line information for vertically adjacent lines of the odd field. Based on the two pieces of scan line information thus supplied to the calculation circuit 23, the circuit 23 calculates and produces image information to be used for scanning the even field line between these two vertically adjacent odd field lines. Stated differently, the calculation circuit 23 produces quasi-information for the even field lines based on the odd field line information.

The even field lane information produced in this way is supplied to the selector 24 along with the odd field line information retrieved from the field memory 21. One or the other is selectively outputted from the selector 24 to the associated D/A converter 25 according to a field identification signal 29 outputted from the synchronization signal generator 28. If the field identification signal 29 indicates the odd field, the odd field line information supplied from the field memory 21 is selected by the selector 24 and outputted to the associated D/A converter 25. On the other hand, if the field identification signal 29 indicates the even field, the results of the calculation performed in the calculation circuit 23 are selected by the selector 24 and outputted to the D/A converter 25.

The output from the selector 24 is subjected to digital-to-analog conversion in the D/A converter 25 and the resultant analog signal is sent to the RGB encoder 27. In the same manner, the green (G) and blue (B) components which form the remainder of the video signal are retrieved from the field memory 21 and processed in the green component block 26b and the blue component block 26c, respectively, in the same manner that the red component is processed in the red component block 26a. The resultant signals are converted into analog signals and set to the RGB encoder The red (R), green (G) and blue (B) analog signals inputted into the RGB encoder 27 are converted into an NTSC video signal 31 for forming an image on the television monitor 30.

Because only odd field information is stored in the field memory 21, an image processor with the configuration shown in FIG. 1 can operate with the field memory 21 having only half the normally required memory capacity. However, there has been known problem in that additional components, such as the line memory 22, are required in each block 26a, 26b and 26c for interpolating the red, green and blue color components that make up the image. The extra components complicate the structure of the device and increase production costs.

SUMMARY OF THE INVENTION

It is therefore an object of the present invention to overcome the above-described drawbacks, and to provide an improved image processor wherein interpolating processes for vertically aligned horizontal scans are performed on only one component of the red, blue and green color components that make up an image.

Another object of the present invention is to provide an image processor that has a simple structure which requires less line memory capacity than conventionally required and moreover that is capable of outputting an interpolated image with good quality and without flicker in the image.

To achieve the above and other objects, there is provided an image processor for constructing a complete picture with an odd field and an even field which are formed by interlaced scanning. The image processor includes synchronization signal generation means which sequentially generates synchronization signals at a predetermined timing, end field identification means for producing a field identification signal identifying one of the odd field and the even field. A field memory is provided for storing field data of selected one of the odd field and the even field. Preferably, the field memory stores the odd field data. The field memory separately outputs red color video data, blue color video data and green color video data contained in the field data on a line-by-line basis of horizontal lines making up of the selected field in response to a synchronizing signal generated from the synchronizing signal generation means.

To produce data of non-selected field which may be the even field data, a line memory is provided which is operatively connected to the field memory to receive and store one line green color video data. The line memory outputs the one line green color video data in response to an ensuing synchronization signal generated after the synchronization signal. Calculation means is operatively connected to the field memory to receive another one line green color video data outputted from the field memory in response to the ensuing synchronizing signal. The calculation means is also connected to the line memory to receive the one line green color video data generated from the field memory preceding to the another one line green color video data. The calculation means calculates an interline green color video data to be scanned along a line of non-selected field falling between adjacent two lines of the selected field scanned by the one line green color video data and the another one line green color video data based on the one line green color video data and the another one line green color video data. Switching means is operatively connected to the calculation means to receive the interline green color video data and also connected to the field memory to receive the one line green color video data. The switching means selectively outputs the interline green color video data and the one line green color video data in response to the field identification signal.

First delay means is provided for delaying the red color video data outputted from the field memory in synchronization with timing at which green color video data is outputted from the switching means. Likewise, second delay means is provided for delaying the blue color video data outputted from the field memory in synchronization with the timing at which green color video data is outputted from the switching means.

The image processor described above is provided with the line memory, the calculation means and the switching means for the color green only. However, an image processor is additionally provided with a line memory, a calculation means and a switching means for either the color blue or red. A delay circuit is provided for the color to which the line memory and the like are not provided.

According to the invention, interpolation is always performed for the green component, which makes up a great deal of the luminance component. Even when only green is interpolated, 59% of the total luminance component of yellow is interpolated so that flicker is reduced to a practical level. Further, only one third the number of line memory and other components for interpolation is sufficient. By providing components for interpolation of either the red or the blue color components, the effects of interpolation are further improved and flicker further reduced.

More specifically, if components are additionally provided for processing the red component, interpolation for the luminance (Y) would be performed on color components that account for 89% (i.e., 0.59 G+0.30 R=89%) of the total luminance (Y). If components are additionally provided for processing the blue component, interpolation for the luminance (Y) would be performed on color components that account for 70% (i.e., 0.59 G+ 0.11 B=70%) of the total luminance (Y). In these cases, the Mount Of line memory is reduced to two thirds the conventionally required amount. The calculation means, the switching means and the like need only be provided for the color green and either the color red or the color blue.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENT

Figure 1:
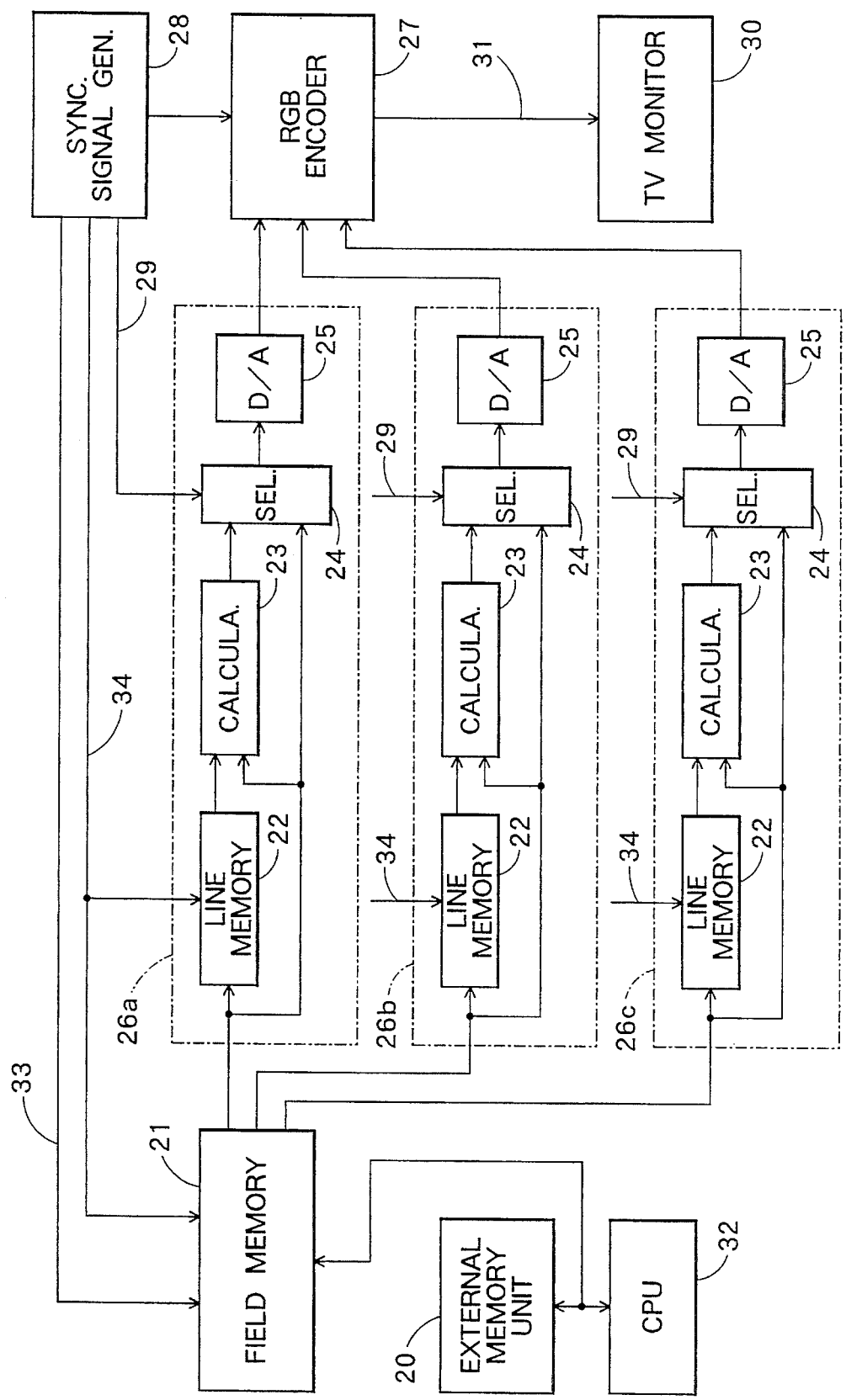
FIG. 1 is a block diagram showing a conventional image processor.
Figure 2:
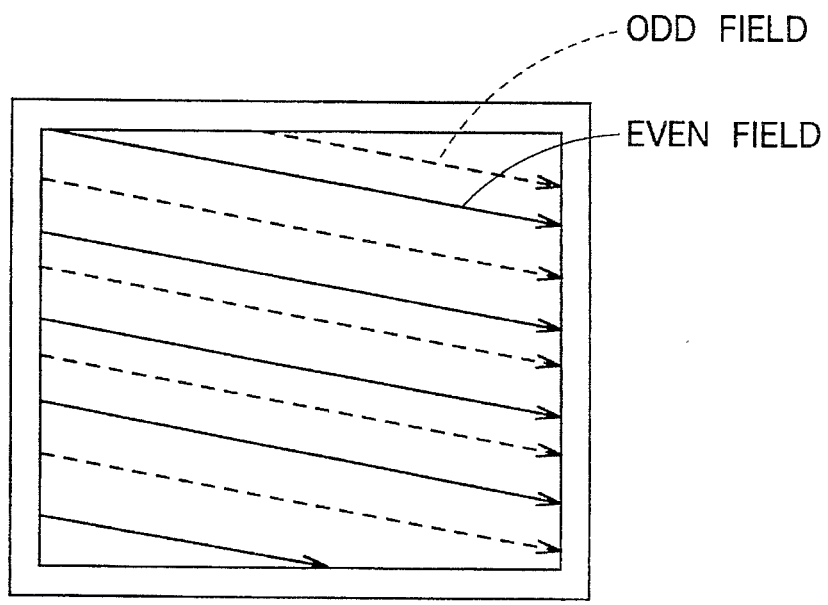
FIG. 2 is an explanatory diagram illustrating interlaced scanning on a TV screen.

An image processor according to a preferred embodiment of the present invention will be described while referring to the accompanying drawings wherein like parts and components are designated by the same reference numerals to avoid duplicating description.

Figure 3:
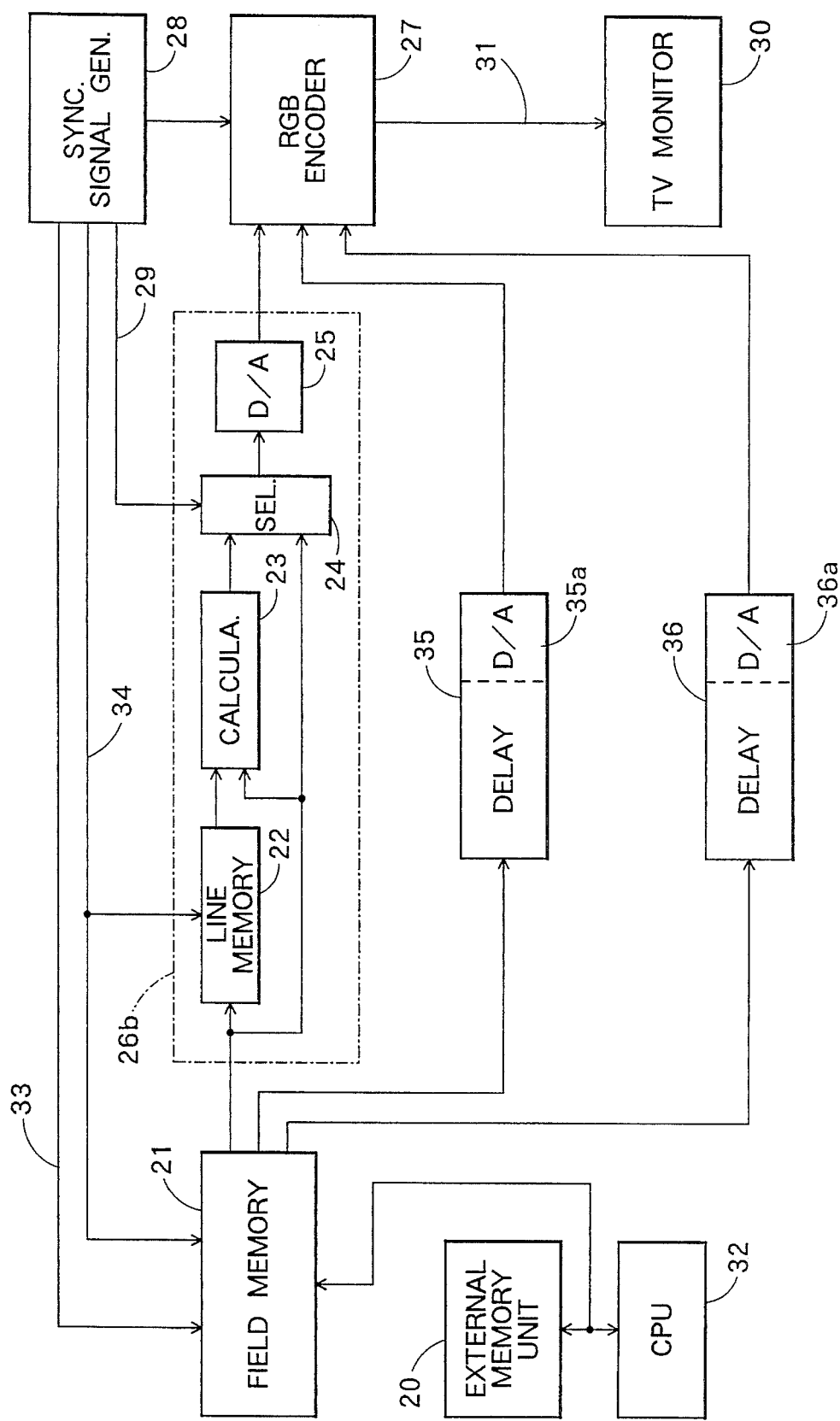
FIG. 3 is a block diagram showing an image processor according to a preferred embodiment of the present invention.

In contrast to the conventional image processor shown in FIG. 3, wherein interpolation arrangements are provided in the red component block 26a, the green component block 26b and the blue component block 26c for each of the three color components red (R), green (G), and blue (B), respectively, the image processor according to the preferred embodiment of the present embodiment is configured so that red and blue color components of odd field information retrieved from the field memory 21 are used not only for constructing the odd field but also for constructing the even field.

More specifically, the block 26b including the line memory 22, the calculation circuit 23, the selector 24 and the D/A converter 25 is provided for the green component of the digital video signal. On the other hand, a delay circuit 35 with a D/A converter 35a is provided for the red color component and a delay circuit 36 with a D/A converter 36a is provided for the blue color component. The delay circuits 35 and 36 delay timing of output therefrom to adjust for the delay in output of the green component caused by processes for the green component performed in the calculation circuit 23 and selector 24. This structure brings timing of output from the red component delay circuit 35 and the blue component delay circuit 36 in coincidence with timing of output from the green component from the block 26b.

Next, operations of the image processor according to the present embodiment will be provided. The CPU 32 retrieves a digital video signal from an external memory unit 20 and writes it in the field memory 21. The green (G) component of the video signal written in the field memory 21 is retrieved in timed relation to the vertical synchronization signal 33 and the horizontal synchronization signal 34 fed from the synchronization signal generator 28 and is written in the line memory 22 of the block 26b and in the calculation circuit 23. The line memory 22 is in a first-in first-out (FIFO) configuration and outputs the preceding line information with respect to the line information now fed from the field memory 21. The preceding line information from the line memory 22 follows the horizontal synchronization signal fed from the synchronization signal generator 28.

The information outputted from the line memory 22, hat is, the image information of the (n-1)th scan line of the odd field, and the output from the field memory 21, that is, the image information of the n-th scan line of the odd field, are inputted to the calculation circuit 23. The calculation circuit 23 averages the image information of the vertically adjacent two lines in the odd field to produce an interpolation information to be used for the line between the adjacent two lines in the odd field. As an illusory example of processes that can be performed in the calculation circuit 23, the following calculation can be performed based on two pieces of image information m and k of two vertically adjacent lines in the odd field in order to produce image information J of the line in the even field which runs between the adjacent two lines in the odd field:

$$j=(m+k)/2.$$

The calculation as above is performed on a picture element basis. The image information obtained by subjecting image information inputted into the calculation circuit 23 to this equation and the odd field image information retrieved from the field memory 21 are sent to the selector 24. One or the other are selected therein according to the field identification signal 29 inputted to the selector 24 from the synchronization signal generator 28. For example, when constructing the odd field image, the Odd line image information is selected and outputted to the D/A converter 25 in the same form as received from the field memory 21. On the other hand, when constructing the even field image, the results of the calculation performed in the calculation circuit 23 are selected and outputted to the D/A converter 25. The output from the selector 24 is subjected to digital-to-analog conversion by the D/A converter 25 and the resultant analog signal is sent to the RGB encoder 27.

On the other hand, the remainder of the image information formed by the red (R) and blue (B) components are converted to analog signals in the red component delay circuit 35, which may be constructed with a shift register, and the blue component delay circuit 36, respectively, and then sent to the RGB encoder 27 at timing synchronized with output from the green component block 26b. The analog signals for the red (R), green (G) and blue (B) components inputted to the RGB encoder 27 are converted into an NTSC video signal 31 for forming an image on the television monitor 30.

In the present embodiment, only one set of line memory 22, calculation circuit 23 and selector 24 is required for processing the green color component. Also, the configuration of the improved image processor is simpler than that of the conventional processor.

Next, a description will be provided for how output of an interpolated image with no flicker and will no great drop in picture quality is possible when interpolation is performed only on the green component.

An image viewed by the human eye remains in the eye for a brief time as a residual image. Interlaced scanning takes advantage of this phenomenon to generate pictures with resolution of approximately 480 horizontal lines per picture. To produce a complete picture with interlaced scanning, horizontal lines of an odd field are first scanned proceeding in the vertical direction. Then the horizontal lines of an even field are scanned while residual images of the odd field still remain in the eye of the viewer.

When the came data is used for both odd and even fields, the resolution of the resultant picture is only 240 horizontal lines per picture. Also, because the line of same information appears first in a line of one field and then in an adjacent line of the other field, the line of information appears to change position. The human eye interprets this rapid position change as a flicker in the picture screen.

Figure 6:
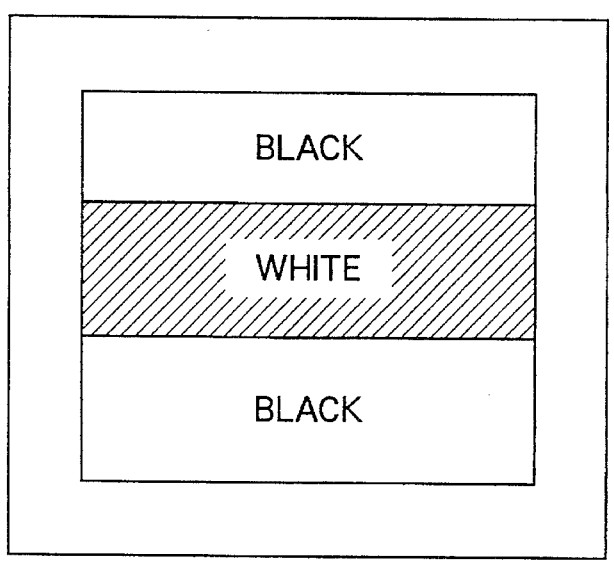
FIG. 6 is a diagram showing a horizontally extending white belt displayed on a black background TV screen.

Flicker is caused by luminance component. Flicker therefore appears most noticeable at the border between black and white regions because black and white data involves the greatest Change in the luminance components. As shown in FIG. 6, at the border line, a line of black image data (or white image data depending on the border line) is alternately displayed in each field. Thus the picture appears to vibrate or flicker back and forth in the vertical direction. Contrarily, flicker will be at a level that is almost undiscernible when adjacent lines of different fields are displayed with the same data for minor luminance components.

A video signal for the luminance (Y) contains color components red (R), green (G), and blue (B) in the following ratio:

$$Y=0.59\ G+0.30\ R+0.11\ B.$$

Because only the green component is interpolated according to the present embodiment, 59% of the total luminance component is interpolated. Because the green component comprises a large part of the luminance component data, this interpolation is very effective in improving flicker. Data for minor luminance components is not interpolated, but flicker is not very noticeable because of the small contribution the minor luminance components make to the displayed image. By only interpolating the green component, an interpolated image with no large drop in image quality and with no flicker can be obtained with a simpler structure than conventional image processors.

Figure 4:
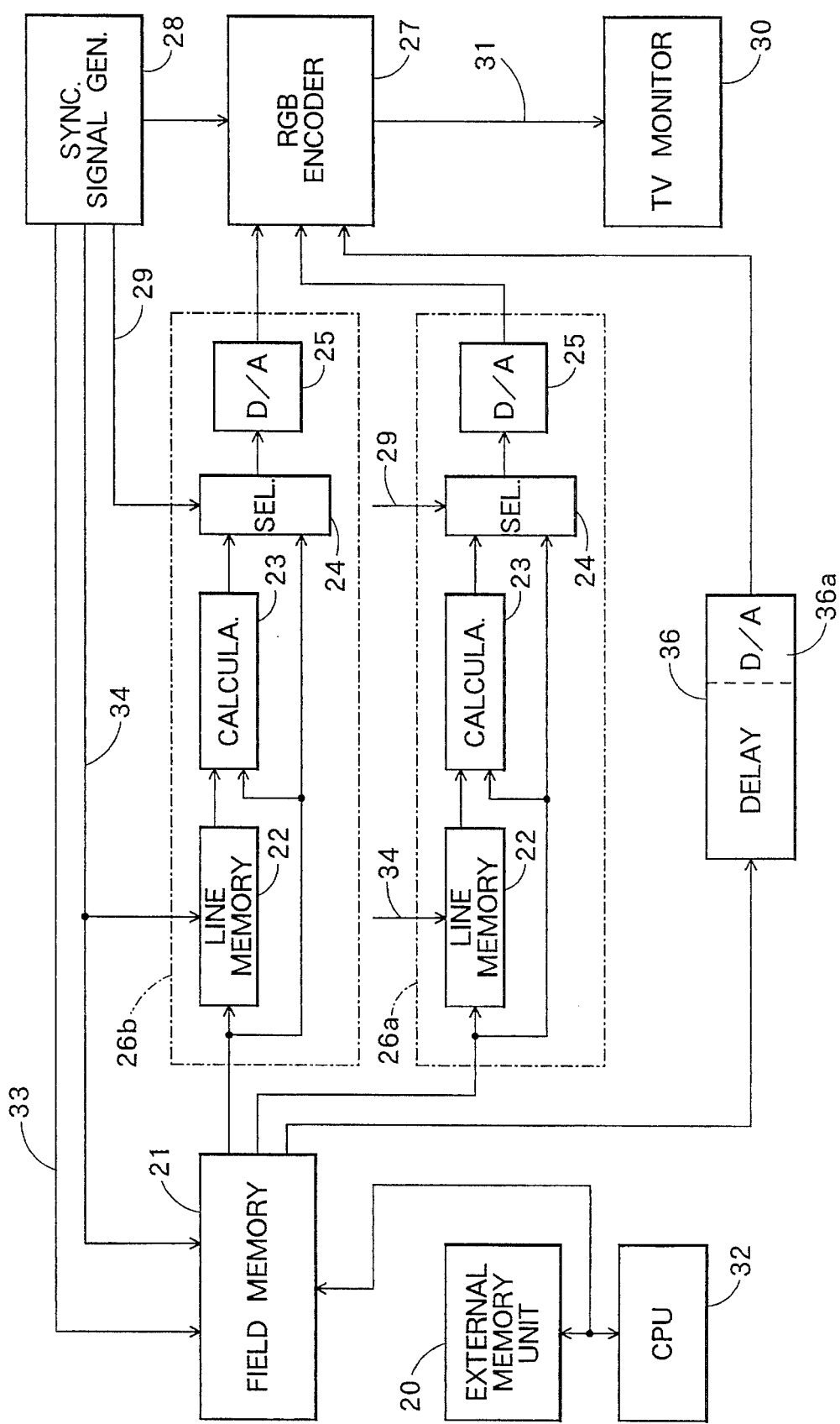
FIG. 4 is a block diagram showing a modification of the image processor shown in FIG. 3.
Figure 5:
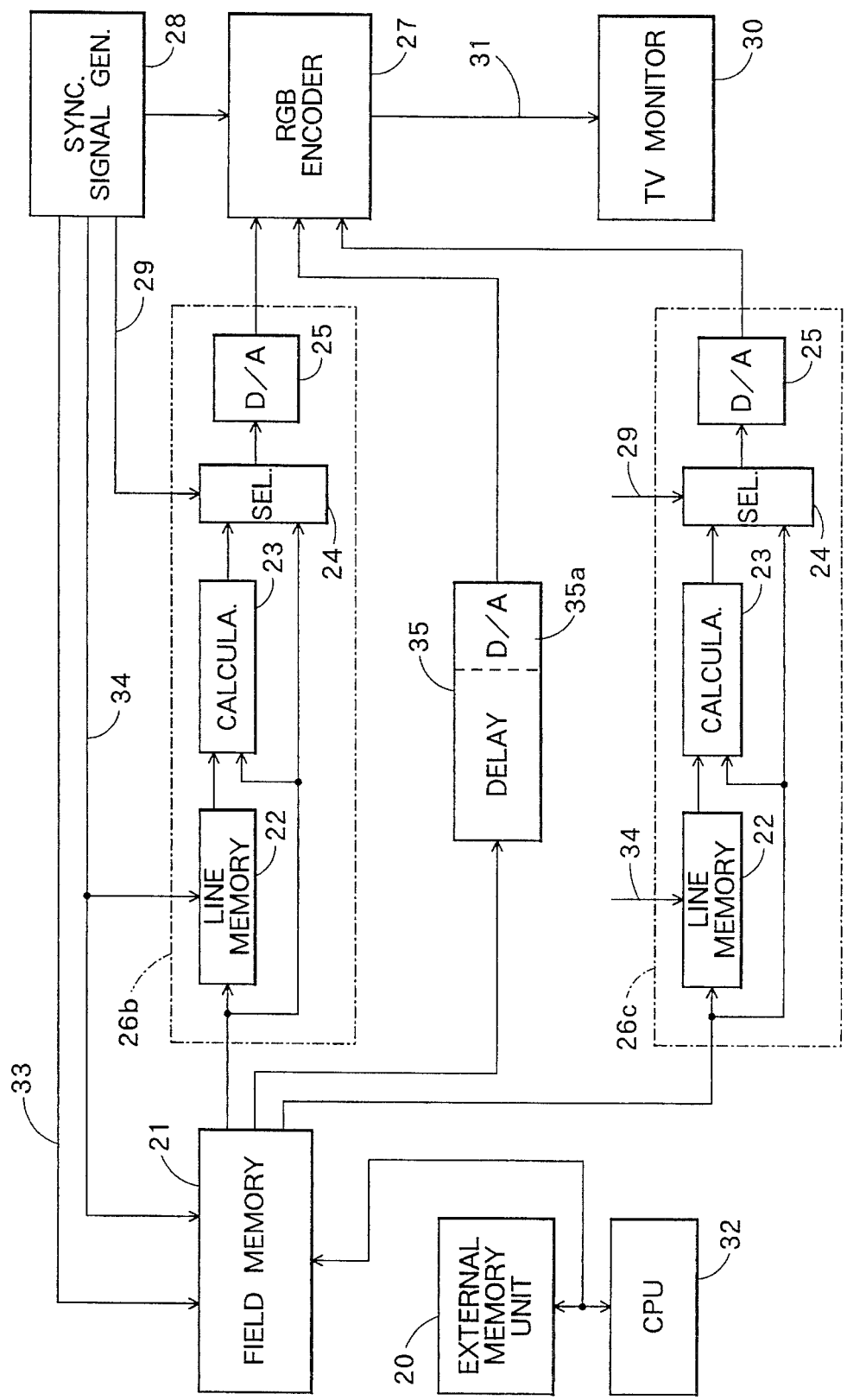
FIG. 5 is a block diagram showing another modification of the image processor shown in FIG. 3.

The present embodiment has been described with the line memory 22, calculation circuit 23, selector 24 and the like provided only for the color green of the three primary colors. However, the line memory 22, calculation circuit 23, selector 24 and the D/A converter 25 can be provided in place of either the red component delay circuit 35 or the blue component delay circuit 36 as shown in FIGS. 4 and 5 for processing information on the color red or blue, respectively, in addition to components provided for the color green.

If components are additionally provided for processing the red component, interpolation for the luminance (Y) would be performed on color components that account for 89% (i.e., 0.59 G+0.30 R= 89%) of the total luminance (Y). If components are additionally provided for processing the blue component, interpolation for the luminance (Y) would be performed on color components that account for 70% (i.e., 0.59 G+ 0.11 B= 70%) of the total luminance (Y). In these cases, the number of line memories is reduced to two thirds the conventionally required number. Also, the calculation circuit 23 serving as calculation means, the selector 24 serving as switching means, and the like need only be provided for the color green and for either the color red or the color blue.

With the configuration shown in FIG. 3, interpolation is always performed for the green component, which makes up a great deal of the luminance component. Even When only green is interpolated, 59% of the total luminance is interpolated so that flicker is reduced to a practical level. Only one third the number of line memories and other components for interpolation is sufficient. This great reduction in the required line memory number to a great improvement in the overall image processor. By providing components for interpolation of either the red or the blue color components, the effects of interpolation are further improved and flicker further reduced. The number of line memories is reduced to two thirds the conventionally required number.

While the invention has been described in detail with reference to specific embodiments thereof, it would be apparent to those skilled in the art that various changes and modifications may be made therein without departing from the spirit of the invention, the scope of which is defined by the attached claims.

What is claimed:

1. An image processor for constructing a complete picture with an odd field and an even field which are formed by interlaced scanning, comprising:

synchronization signal generation means for sequentially generating synchronization signals at a predetermined timing;

field identification means for producing a field identification signal identifying one of the odd field and the even field;

a field memory for storing field data of selected one of the odd field and the even field and for separately outputting red color video data, blue color video data and green color video data contained in the field data on a line-by-line basis of horizontal lines making up of the selected field and the even field in response to a synchronizing signal generated from said synchronizing signal generation means;

a line memory operatively connected to said field memory to receive and store one line green color video data, said line memory outputting the one line green color video data in response to an ensuing synchronization signal generated after the synchronization signal;

calculation means operatively connected to said field memory to receive another one line green color video data outputted from said field memory in response to the ensuing synchronizing signal and also connected to said line memory to receive the one line green color video data generated from said field memory preceding to the another one line green color video data, said calculation means calculating an interline green color video data to be scanned along a line of non-selected field falling between adjacent two lines of the selected field scanned by the one line green color video data and the another one line green color video data based on the one line green color video data and the another one line green color video data;

switching means operatively connected to said calculation means to receive the interline green color video data and also connected to said field memory to receive the one line green color video data, said switching means selectively outputting the interline green color video data and the one line green color video data in response to the field identification signal;

first delay means for delaying the red color video data outputted from said field memory in synchronization with timing at which green color video data is outputted from said switching means; and second delay means for delaying the blue color video data outputted from said field memory in synchronization with the timing at which green color video data is outputted from said switching means.

2. An image processor according to claim 1, wherein said line memory is of a first-in, first-out configuration in regards to input and output of the one line green color video data.

3. An image processor according to claim 2, wherein the field data stored in said field memory is in the form of a digital signal.

4. An image processor according to claim 3, wherein each of said first delay means and said second delay means comprises a shift register.

5. An image processor according to claim 3, wherein said calculation means performs calculation of the one line green color video data and the another one line green color video data on a picture element basis.

6. An image processor according to claim 5, further comprising first digital-to-analog conversion means operatively connected to said switching means for subjecting an output from said switching means to digital-to-analog conversion to output a green analog video data, second digital-to-analog conversion means operatively connected to said first delay means for subjecting an output from said first delay means to digital-to-analog conversion to output a red analog video data, and third digital-to-analog conversion means operatively connected to said second delay means for subjecting an output from said second delay means to digital-to-analog conversion to output a blue analog video data.

7. An image processor according to claim 6, further comprising encoding means connected to said first, second and third digital-to-analog conversion means to receive the green analog video data, the red analog video data and the blue analog video data, respectively, said encoding means converting the green analog video data, the red analog video data and the blue analog video data into an NTSC video data.

8. An image processor for constructing a complete picture with an odd field and an even field which are formed by interlaced scanning, comprising:

synchronization signal generation means for sequentially generating synchronization signals at a predetermined timing;

field identification means for producing a field identification signal identifying one of the odd field and the even field;

a field memory for storing data of the odd field and for separately outputting red color video data, blue color video data and green color video data contained in the data of the odd field on a line-by-line basis of horizontal lines making up of the odd field in response to a synchronizing signal generated from said synchronizing signal generation means;

a line memory operatively connected to said field memory to receive and store one line green color video data, said line memory outputting the one line green color video data in response to an ensuing synchronization signal generated after the synchronization signal;

calculation means operatively connected to said field memory to receive another one line green color video data outputted from said field memory in response to the ensuing synchronizing signal and also connected to said line memory to receive the one line green color video data generated from said field memory preceding to the another one line green color video data, said calculation means calculating an interline green color video data to be scanned along a line of the even field falling between adjacent two lines of the odd field scanned by the one line green color video data and the another one line green color video data based on the one line green color video data and the another one line green color video data;

switching means operatively connected to said calculation means to receive the interline green color video data and also connected to said field memory to receive the one line green color video data, said switching means selectively outputting the interline green color video data and the one line green color video data in response to the field identification signal;

first delay means for delaying the red color video data outputted from said field memory in synchronization with timing at which green color video data is outputted from said switching means; and second delay means for delaying the blue color video data outputted from said field memory in synchronization with the timing at which green color video data is outputted from said switching means.

9. An image processor according to claim 8, wherein said line memory is of a first-in, first-out configuration in regards to input and output of the one line green color video data.

10. An image processor according to claim 9, wherein the field data stored in said field memory is in the form of a digital signal.

11. An image processor according to claim 10, wherein each of said first delay means and said second delay means comprises a shaft register.

12. An image processor according to claim 10, wherein said calculation means performs calculation of the one line green color video data and the another one line green color video data on a picture element basis.

13. An image processor for constructing a complete picture with an odd field and an even field which are formed by interlaced scanning, comprising:

synchronization signal generation means for sequentially generating synchronization signals at a predetermined timing;

field identification means for producing a field identification signal identifying one of the odd field and the even field;

a field memory for storing field data of selected one of the odd field and the even field and for separately outputting red color video data, blue color video data and green color video data contained in the field data on a line-by-line basis of horizontal lines making up of the selected field and the even field in response to a synchronizing signal generated from said synchronizing signal generation means;

a first line memory operatively connected to said field memory to receive and store one line green color video data, said line memory outputting the one line green color video data in response to an ensuing synchronization signal generated after the synchronization signal;

first calculation means operatively connected to said field memory to receive another one line green color video data outputted from said field memory in response to the ensuing synchronizing signal and also connected to said first line memory to receive the one line green color video data generated from said field memory preceding to the another one line green color video data, said first calculation means calculating an interline green color video data to be scanned along a line of non-selected field falling between adjacent two lines of the selected field scanned by the one line green color video data and the another one line green color video data based on the one line green color video data and the another one line green color video data;

first switching means operatively connected to said first calculation means to receive the interline green color video data and also connected to said field memory to receive the one line green color video data, said first switching means selectively outputting the interline green color video data and the one line green color video data in response to the field identification signal;

a second lane memory operatively connected to said field memory to receive and store one line red color video data, said second line memory outputting the one line red color video data in response to the ensuing synchronization signal generated after the synchronization signal;

second calculation means operatively connected to said field memory to receive another one line red color video data outputted from said field memory in response to the ensuing synchronizing signal and also connected to said second line memory to receive the one line red color video data generated from said field memory preceding to the another one line red color video data, said second calculation means calculating an interline red color video data to be scanned along the line of non-selected field falling between the adjacent two lines of the selected field scanned by the one line red color video data and the another one line red color video data based on the one line red color video data and the another one line red color video data;

second switching means operatively connected to said second calculation means to receive the interline red color video data and also connected to said field memory to receive the one line red color video data, said second switching means selectively outputting the interline red color video data and the one line red color video data in response to the field identification signal; and delay means for delaying the blue color video data outputted from said field memory in synchronization with the timing at which green color video data and red color video are outputted from said first switching means and said second switching means, respectively.

14. An image processor according to claim 13, wherein said first line memory is of a first-in, first-out configuration in regards to input and output of the one line green color video data, and wherein said second line memory is of a first-in, first-out configuration in regards to input and output of the one line red color video data.

15. An image processor according to claim 14, wherein the field data stored in said field memory is in the form of a digital signal.

16. An image processor according to claim 15, wherein said delay means comprises a shift register.

17. An image processor according to claim 15, wherein said first calculation means performs calculation of the one line green color video data and the another one line green color video data on a picture element basis, and wherein said second calculation means performs calculation of the one line red color video data and the another one line red color video data on a picture element basis.

18. An image processor for constructing a complete picture with an odd field and an even field which are formed by interlaced scanning, comprising:

synchronization signal generation means for sequentially generating synchronization signals at a predetermined timing;

field identification means for producing a field identification signal identifying one of the odd field and the even field;

a field memory for storing field data of selected one of the odd field and the even field and for separately outputting red color video data, blue color video data and green color video data contained in the field data on a line-by-line basis of horizontal lines making up of the selected field and the even field in response to a synchronizing signal generated from said synchronizing signal generation means;

a first line memory operatively connected to said field memory to receive and store one line green color video data, said line memory outputting the one line green color video data in response to an ensuing synchronization signal generated after the synchronization signal;

first calculation means operatively connected to said field memory to receive another one line green color video data outputted from said field memory in response to the ensuing synchronizing signal and also connected to said first line memory to receive the one line green color video data generated from said field memory preceding to the another one line green color video data, said first calculation means calculating an interline green color video data to be scanned along a line of non-selected field falling between adjacent two lines of the selected field scanned by the one line green color video data and the another one line green color video data based on the one line green color video data and the another one line green color video data;

first switching means operatively connected to said first calculation means to receive the interline green color video data and also connected to said field memory to receive the one line green color video data, said first switching means selectively outputting the interline green color video data and the one line green color video data in response to the field identification signal;

a second line memory operatively connected to said field memory to receive and store one line blue color video data, said second line memory outputting the one line blue color video data in response to The ensuing synchronization signal generated after the synchronization signal;

second calculation means operatively connected to said field memory to receive another one line blue color video data outputted from said field memory in response to the ensuing synchronizing signal and also connected to said second line memory to receive the one line blue color video data generated from said field memory preceding to the another one line blue color video data, said second calculation means calculating an interline blue color video data to be scanned along the line of non-selected field falling between the adjacent two lines of the selected field scanned by the one line blue color video data and the another one line blue color video data based on the one line blue color video data and the another one line blue color video data;

second switching means operatively connected to said second calculation means to receive the interline blue color video data and also connected to said field memory to receive the one line blue color video data, said second switching means selectively outputting the interline blue color video data and the one line blue color video data in response to the field identification signal; and delay means for delaying the red color video data outputted from said field memory in synchronization with the timing at which green color video data and blue color video are outputted from said first switching means and said second switching means, respectively.

19. An image processor according to claim 18, wherein said first line memory is of a first-in, first-out configuration in regards to input and output of the one line green color video data, and wherein said second line memory is of a first-in, first-out configuration in regards to input and output of the one line blue color video data.

20. An image processor according to claim 19, wherein the field data stored in said field memory is in the form of a digital signal.

21. An image processor according to claim 20, wherein said delay means comprises a shift register.

22. An image processor according to claim 20, wherein said first calculation means performs calculation of the one line green color video data and the another one line green color video data on a picture element basis, and wherein said second calculation means performs calculation of the one line blue color video data and the another one line blue color video data on a picture element basis.

* * * * *